United States Patent [19]
Throngnumchai et al.

[11] Patent Number: 5,629,704
[45] Date of Patent: May 13, 1997

[54] TARGET POSITION DETECTING APPARATUS AND METHOD UTILIZING RADAR

[75] Inventors: Kraisorn Throngnumchai, Yokohama; Teruyoshi Mihara; Hiroshige Fukuhara, both of Yokosuka; Yukitsugu Hirota, Kamakura, all of Japan

[73] Assignee: Nissan Motor Co., Ltd., Kanagawa, Japan

[21] Appl. No.: 527,677

[22] Filed: Sep. 12, 1995

[30] Foreign Application Priority Data

Sep. 12, 1994 [JP] Japan .................. 6-243381

[51] Int. Cl.⁶ ............................................... G01S 7/483
[52] U.S. Cl. .................... 342/54; 342/56; 342/126; 342/133; 342/139; 342/146
[58] Field of Search .................... 342/53, 54, 56, 342/126, 133, 139, 146, 157, 158

[56] References Cited

U.S. PATENT DOCUMENTS

| | | | |
|---|---|---|---|
| 4,632,543 | 12/1986 | Endo | 356/5.08 |
| 4,677,599 | 6/1987 | Obayashi et al. | 367/99 |
| 4,757,450 | 7/1988 | Etoh | 364/426.04 |
| 4,926,170 | 5/1990 | Beggs et al. | 340/904 |
| 4,949,074 | 8/1990 | D'Ambrosia et al. | 340/552 |
| 5,239,516 | 8/1993 | Kimura | 367/91 |
| 5,283,622 | 2/1994 | Ueno et al. | 356/4.01 |
| 5,471,215 | 11/1995 | Fukuhara et al. | 342/70 |
| 5,493,388 | 2/1996 | Adachi | 356/5.01 |
| 5,504,569 | 4/1996 | Kato et al. | 356/3.11 |

FOREIGN PATENT DOCUMENTS

| | | |
|---|---|---|
| 58-103603 | 6/1983 | Japan . |
| 4-122809 | 4/1992 | Japan . |
| 5-164701 | 6/1993 | Japan . |

*Primary Examiner*—John B. Sotomayor
*Attorney, Agent, or Firm*—Lowe, Price, LeBlanc & Becker

[57] ABSTRACT

In a radar target position detecting apparatus, beams (, for example, light beams) irradiated from a transmitter(, for example, LED) have a predetermined divergence angle, a plurality of light (beam) receiving elements such as photodiode arrays each having a different receiving angle (directivity) are arranged in an array form, and a direction of a reflected wave (beam) is identified according to a position of the arrayed beam (wave) receiving elements in the array at which the reflected wave (beam) is captured.

31 Claims, 11 Drawing Sheets

TARGET POSITION DETECTING APPARATUS AND METHOD UTILIZING RADAR

BACKGROUND OF THE INVENTION

The present invention relates to an apparatus for detecting a target position and method therefor utilizing a radar device.

A first previously proposed target position detecting apparatus will be described below.

A light emitting diode (LED) is provided which emits visible light pulses or ultra-red light pulses, receiving a command from a signal processor. Generally, since a width (or solid angle or divergence angle) of the light beams from the LED is very large (or very wide), a throttling of the light beams using a lens group is used to narrow the light beams. Then, the throttled light beams are reflected by means of a rotary mirror to direct toward a target. It is noted that an angle of the rotary mirror with respect to the target is adjusted by means of the signal processor and the rotation of the rotary mirror causes the light beams to scan an area surrounding the target.

When the light beams are reflected on the beam impinged target, the reflected light beams are passed through a lens and reached to a light receiving element (device). The signal processor measures a time difference between the time at which the light beams are emitted from the light emitting diode to the time at which the light beams are received by the light receiving element. According to a rotation angle of the rotary mirror, a direction of the target is accordingly calculated. A laser may be used in placed of the LED.

Next, a second previously proposed target position detecting apparatus will be described below.

Ultrasonic waves generated by means of a speaker are reflected by means of the target and reached to a microphone. The signal processor measures a time duration from a time at which the ultrasonic waves are irradiated from the speaker to a time at which the reflected ultrasonic waves are reached to the target so as to enable the calculation of a distance from the apparatus to the target. In the latter case, the ultrasonic wave beams are throttled and the speaker is rotated by means of such a drive source as a motor to enable scanning over the target. The direction of the target can be calculated according to the scanning of the ultrasonic waves over the target.

A co-pending U.S. patent application Ser. No. 08/289,087 filed on Aug. 11, 1994 (which corresponds to a German Patent Application No. P 44 026.8 (filed on Aug. 24, 1994 and published as DE 44 30 026 A1 on Mar. 9, 1995) and corresponds to a French Patent Application No. 94 10 495 (filed on Aug. 31 1994 and published as No. 27 09 558 (No. 10 issued on Mar. 10, 1995)) exemplifies a third previously proposed target position detecting apparatus using the radar device.

However, each of the previously proposed target position detecting apparatuses requires the throttled light beams and a rotation mechanism for the throttled (converged) light beams to be scanned over the area surrounding the target. Consequently, a cost of manufacturing each of the previously proposed the target position detecting apparatuses becomes relatively high and a reliability of the apparatus due to such a mechanical loss as a wear-out of the rotation mechanism (in an engaged mechanism between the rotation mechanism and the drive source) becomes reduced.

Furthermore, since a rotation speed of the rotation mechanism is so slow that the scanning speed is correspondingly very slow and that a detection time until the target is located by the scanning operation tends to become accordingly longer.

Furthermore, in each of the previously proposed target position detecting apparatuses, the direction of the target is detected from a (mechanical) rotating mechanism. Therefore, each of the previously proposed apparatuses requires the highly accurate rotating mechanism and requires a precisely controlled detection mechnism of a rotating angle of the rotating mechanism. Consequently, it becomes difficult to reduce costs of manufacturing the target position detecting apparatuses.

SUMMARY OF THE INVENTION

It is a principal object of the present invention to provide an apparatus and method for detecting a target position utilizing a radar device having a reduced cost of manufacture, a high reliability, and a high-speed locating to the target.

The above-described object can be achieved by providing an apparatus comprising: a) beam transmitting means for generating and transmitting beams of at least one of either electromagnetic waves or ultrasonic waves, said beams being provided with a fixed predetermined divergence angle with said beam transmitting means as a vertex; b) beam receiving means for receiving at least one reflected beam of the transmitted beams, said beam receiving means including a plurality of individually operable beam receiving elements arranged in an array form and each one of the beam receiving elements having a mutually different directivity from those of any other beam receiving elements; c) first measuring means for determining which one of the beam receiving elements receives the reflected beam and determining a direction of the reflected beam with respect to the reflected beam receiving element on the basis of a position of the reflected beam receiving element in said array formed plurality of beam receiving elements; and d) second measuring means for measuring a time duration from a time at which said beams are transmitted from said beam transmitting means to a time at which said reflected beam receiving element has received the reflected beam and calculating a distance from a beam reflected point of the transmitted beams to the reflected beam receiving element on the basis of the measured time duration.

The above-described object can also be achieved by providing a radar apparatus for at least one wave reflective object, comprising: a) wave beam irradiating means for operatively irradiating wave beams toward a spatial region which is wide enough to include said wave beam reflective object therein; b) wave beam responding means arranged for receiving at least one wave beam irradiated toward the statial region from said wave beam irradiating means and reflected on said reflective object, said wave beam responding means having an array of a plurality of wave beam responding elements arranged at a position of the radar apparatus, each one of said wave beam responding elements having a directivity with respect to the spatial region which is different from those of the other wave beam responding elements; c) first measuring means for identifying one of said wave beam responding elements which receives the reflected wave beam and measuring a direction of the reflective object with respect to the wave beam responding element on the basis of a position of the identified wave beam responding element; and d) second measuring means for measuring a time duration from a time at which the wave beams are irradiated by said wave beam irradiating means to a time at which said reflective wave beam is received by said wave beam responding element and for deriving a distance from the radar apparatus and said wave beam reflected object on the basis of the measured time duration.

The above-described object can also be achieved by providing a method for determining a position of at least one wave beam reflective object, comprising the steps of: a) operatively irradiating wave beams toward a spatial region which is wide enough to include said wave beam reflective object therein in response to a command signal to command irradiation of said wave beams; b) receiving at least one wave beam irradiated from said step a) and reflected on said reflective object, at said step b), providing wave beam responding means having an array of a plurality of wave beam responding elements arranged at a predetermined fixed position, each one of said wave beam responding elements having a directivity with respect to the spatial region different from those of the other wave beam responding elements; and c) identifying one of said wave beam responding elements which receives the reflected wave beam and measuring a direction of the reflective object on the basis of a position of the identified wave beam responding element.

BEST MODE FOR CARRYING OUT THE INVENTION

Reference will hereinafter be made to the drawings in order to facilitate a better understanding of the present invention.

(First Embodiment)

Figure 1:
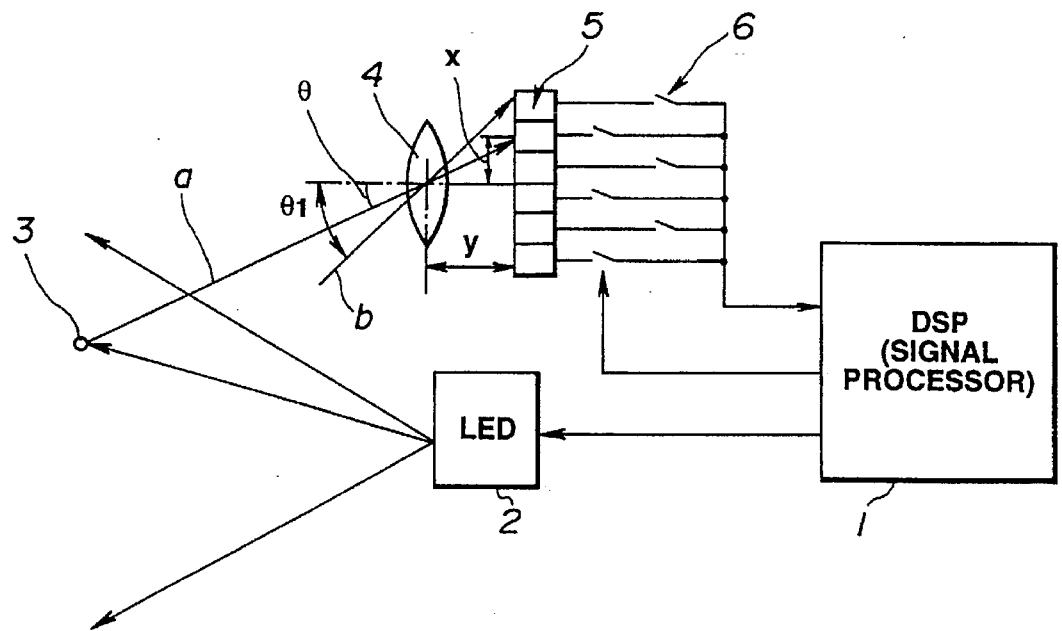
FIG. 1 is an optical system and circuit block diagram of a first preferred embodiment of an apparatus for detecting a position of at least one target according to the present invention.

FIG. 1 shows a system configuration of a target position detecting apparatus in a first preferred embodiment according to the present invention.

A light emitting diode (LED) 2 is connected to a signal processor (generally having a microprocessor, I/O port, a common bus, and a memory) 1 so as to be turned on in response to a command derived from the signal processor 1, thus emitting optical beams such as a visible light or ultra-red light therefrom. It is noted that a divergence angle of the optical beams emitted from the LED 2 needs to be adjusted using, for example, an enclosing member of the LED 2 (such as a socket) to provide a predetermined divergence angle of the optical beams without a throttling of the divergence angle of the optical beams. At least one beam reflected on at least one target 3 reaches to a photodiode array 5 via a lens 4. An output end of the photodiode array 5 is connected to the signal processor 1 via a scanned switch array 6. The scanning over the switch array 6 is controlled by means of the signal processor 1 as will be described later.

Figure 2:
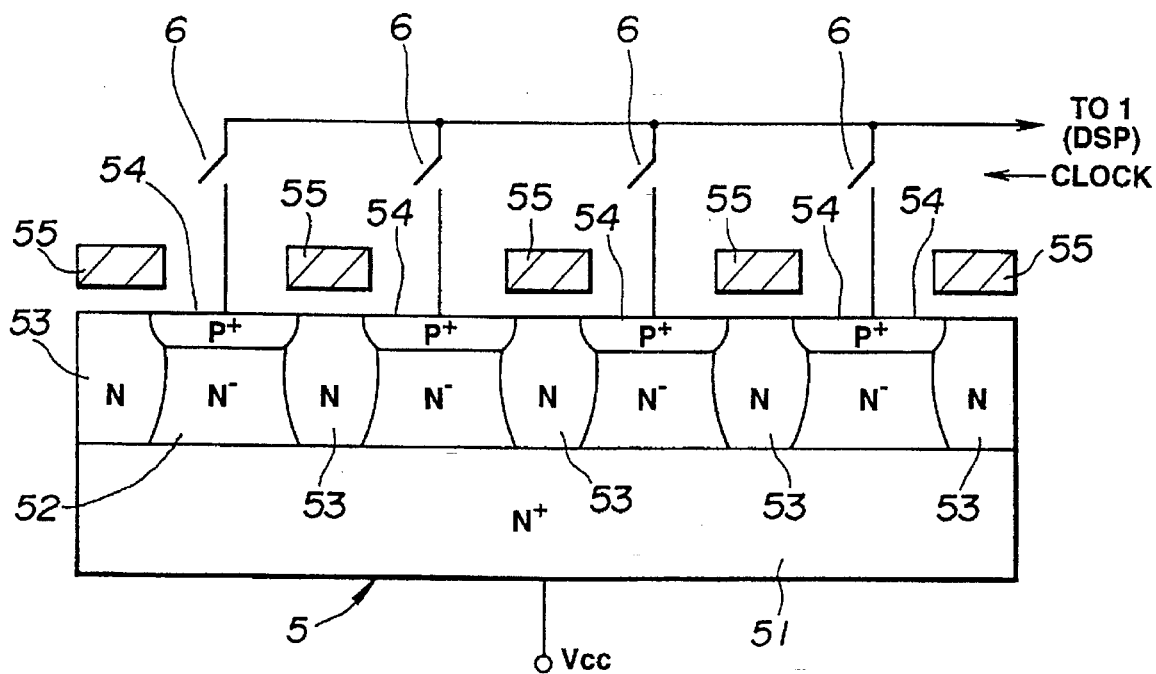
FIG. 2 is a cross sectional view of a target position detecting apparatus used in the first embodiment shown in FIG. 1, especially of a photodiode array 5 shown in FIG. 1.

FIG. 2 shows a cross sectional view of the photodiode array 5 shown in FIG. 1.

The photodiode array 5 includes: a) an $N^+$ substrate 51; b) a plurality of low concentration $N^-$ epitaxial regions 52 formed on the $N^+$ substrate 51; c) a plurality of N type separation regions 53 having higher concentrations than those of the epitaxial regions 52 and formed so as to penetrate through the epitaxial regions 52 to reach to the $N^+$ substrate 51; and d) a plurality of $P^{3o}$ type diffusion regions 54 formed on the epitaxial regions 52 other than the separation regions 53 and which serve as anode electrodes of the respective photodiodes.

It is noted that light transmission obstructing regions 55 are formed above the N-type separation regions 53, the light transmission obstructing regions 55 being constituted by Aluminum (Al) so that the light beams can be received only on the P⁺ type diffusion regions The P⁺ type diffusion regions 54 are connected to the signal processor 1 as shown in FIG. 1 via the scanning switch array 6. A DC power voltage Vcc (+ Vcc as bias voltage supply) is connected to the N⁺ substrate 51. A transparent film is, for example, provided between the light beam obstructing regions 5S and the N type separation regions 53 formed below the regions 55.

Figure 3A:
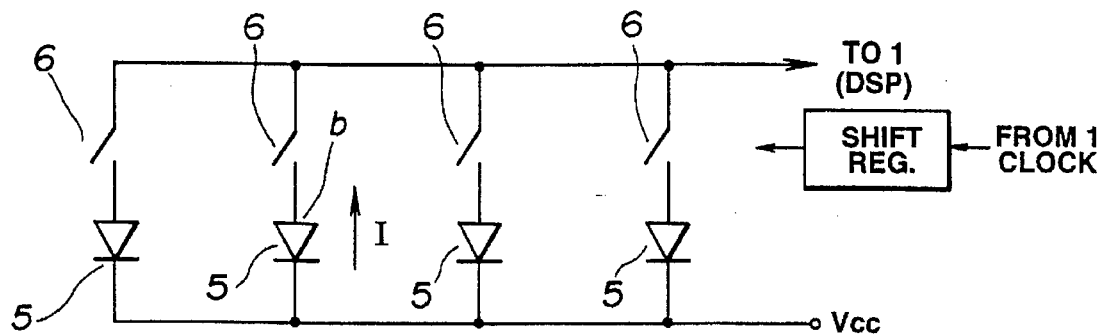
FIG. 3A is an equivalent circuit of the position detecting apparatus used in the first embodiment shown in FIGS. 1 and 2, especially of the photodiode array 5 and switch array 6 shown in FIGS. 1 and 2.

FIG. 3A shows an electrical equivalent circuit of the photodiode array 5 and scanned switch array 6 in the first embodiment according to the present invention.

The individual photodiodes (cathodes) of the photodiode array 5 are connected commonly to the DC power supply Vcc via the single N⁺ substrate 51. A responding current generated in the corresponding one of the photo diodes due to the receipt of the light beam thereon is caused to flow to the signal processor 1 via a serially connected corresponding one (which is closed) of the switch array 6.

Each switch of the switch array 6 is constituted by an analog switch having, for example, a MOSFET (Metal Oxide Semiconductor Field Effect Transistor) or a parallel connection of a P type MOSFET and a N type MOSFET (so called, CMOS).

It is noted that although in the first embodiment shown in FIG. 2 the N type separation regions 53 are penetrated through the N⁻ type epitaxial regions 52 to reach to the N⁺ type substrate 52, the P⁺ type diffusion regions 54 may plurality be separated from each other.

If, as shown in FIG. 1, the target 3 is, for example, present within an irradiation region of the light beams having the predetermined divergence angle and emitted from the light emitting diode (LED) 2, a part of the light beams is reflected on the target 3 to reach to the photodiode array 5 via the lens 4. The lens 4 functions as follows: namely, only the reflected lights of mutually different directions are received by respective cells (respective photodiodes) of the photodiode array 5. For example, as shown in FIG. 1, one of the reflected lights denoted by a has a direction of θ to reach to the corresponding one of the cells and another of the reflected lights denoted by b has a direction of $θ_1$ to reach to the corresponding one of the cells. Hence, the scanning over the switch array 6 permits the search of which one of the cells receives the reflected light in the single direction condensed by the lens 4. The direction of θ of the target 3 with respect to the reflected light received cell (photodiode) can be calculated. In addition, the distance to the target 3 can be calculated by measuring the time difference from a time at which the light beams are emitted from the LED 2 to a time at which the reflected light beam is received by the corresponding one of the cells (photodiodes) since the velocity of the light beams is already known.

The detection of the direction θ of the target 3 will specifically be described below with reference to FIGS. 3A and 3B.

Figure 3B:
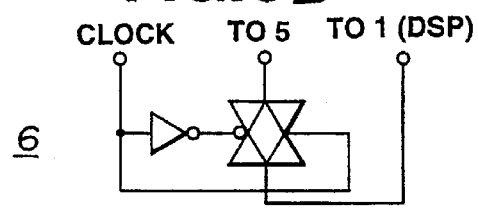
FIG. 3B is a circuit wiring diagram of a representative switch 6 of a switch array 6 shown in FIGS. 1 to 3A.

Each of the switches in the switch array 6 is constituted by the analog switch shown in FIG. 3B. Each drive end of the analog switches 6 receives a clock pulse shifted by a shift register. If any one of the switches 6 receives the clock pulse so as to be closed (turned on), the signal processor does not receive the photocurrent if the corresponding one of the photodiodes does not receive the reflected light beam and does not produce the photocurrent. However, with the corresponding one of the analog switches 6 turned on in response to the clock pulse shifted by the shift register, if the corresponding one of the photodiodes receives the reflected light beam and produces the photocurrent I, the signal processor 1 receives the photocurrent via the closed analog switch. Consequently, the signal processor 1 can identify the position of the corresponding one of the photodiodes 5 which receives the reflected light beam. The scanning over the analog switches can be carried out using the clock pulse shifted by the shift register.

For example, a photocurrent I flows through the photodiode cell b on which the reflected light is impinged from the target 3 as shown in FIG. 3A. The signal processor 1 detects the position of the reflected light received cell into which the photocurrent I flows by the scanning over the switch array 6. Suppose, as shown in FIG. 1, that a distance from the corresponding one of the cells through which the photocurrent I flows to an optical axis is x and the distance from the photodiode array 5 to the lens is y.

The direction θ of the target 3 with respect to the reflected light received photodiode is calculated as follows:

$$θ = \tan^{-1}(x/y) \qquad (1).$$

The calculation of the above-described distance to the target 3 is based on the reciprocating time duration of the light pulses.

As described above, in the first embodiment, the photodiodes are aligned in the array form having mutually different light receiving angles with the light beam divergence angle widened so that the scanning over the switch array 6 causes the detection of the target direction. Consequently, without need to the rotating mirror, the direction of the target can be detected. Then, the manufacturing cost of the target detecting apparatus can be reduced. In addition, since no wear-out portion is present in the apparatus shown in FIG. 1, the reliability is improved. The time duration to the detection of the direction of the target can be shortened.

(Second Embodiment)

Figure 4:
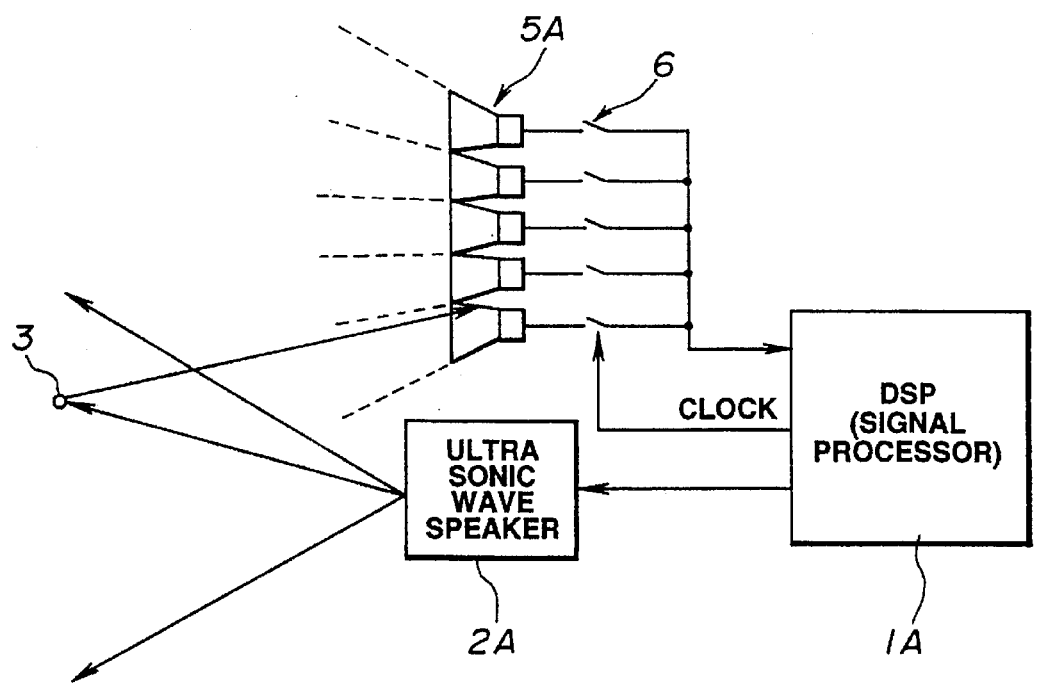
FIG. 4 is a circuit block diagram of the target position detecting apparatus in a second preferred embodiment according to the present invention.

FIG. 4 shows a second preferred embodiment of the target position detecting apparatus according to the present invention.

In the second embodiment an ultra-sonic wave speaker 2A is used in place of the light emitting diode 2 in the first embodiment and a microphone array 5A is used in place of the photodiode array 5 used in the first embodiment. The other arrangement in the target position detecting apparatus is the same as that in the first embodiment.

The ultra-sonic wave speaker 2A irradiates an ultra-sonic wave in response to a command derived from the signal processor 1A and the ultra-sonic wave impinged on and reflected by the target 3 is received by a small-size microphone array 5A. Each shape of the small-sized microphone is designed so that a directivity of each small-sized microphone 5A points to a mutually different direction.

For example, in the second embodiment shown in FIG. 4, five different-shaped small-sized microphones are used in the microphone array 5A, each receivable direction (directivity) being denoted by dot lines of FIG. 4. An output of each microphone is connected to the o signal processor 1A via the scanning switch array 6. The signal processor 1A scans over the switch array 6 to detect to which one microphone of the small-sized microphone array 5A the reflected ultra-sonic array is reached. In the same way, as the first embodiment, the equation (1) is used to calculate the direction of the target 3. To change the directivities of the small-sized respective microphones, the arrangement of each microphone with respect to the microphone array may be changed.

In the second embodiment, ultra-sonic wave beams need not to be throttled, the microphones having mutually different directivities are arranged in plural, the scanning over the switch array 6 permits the detection of the direction of the target 3. Thus, the movement of the speaker 2A (for example, rotation (spinning) of the speaker) is not required and the direction of the target 3 can be calculated. It is of course that the time difference between the irradiation of the ultra-sonic wave and the reaching of the reflected ultrasonic wave to the microphone array can be used to calculate the distance to the target in the same way as in the first embodiment. The same advantages as those in the first embodiment can be achieved. As described in the first embodiment, the scanning method is the use of the clock pulse derived from the signal processor 1A and via the shift register receivable by each of the analog switches 6.

(Third Embodiment)

Figure 5:
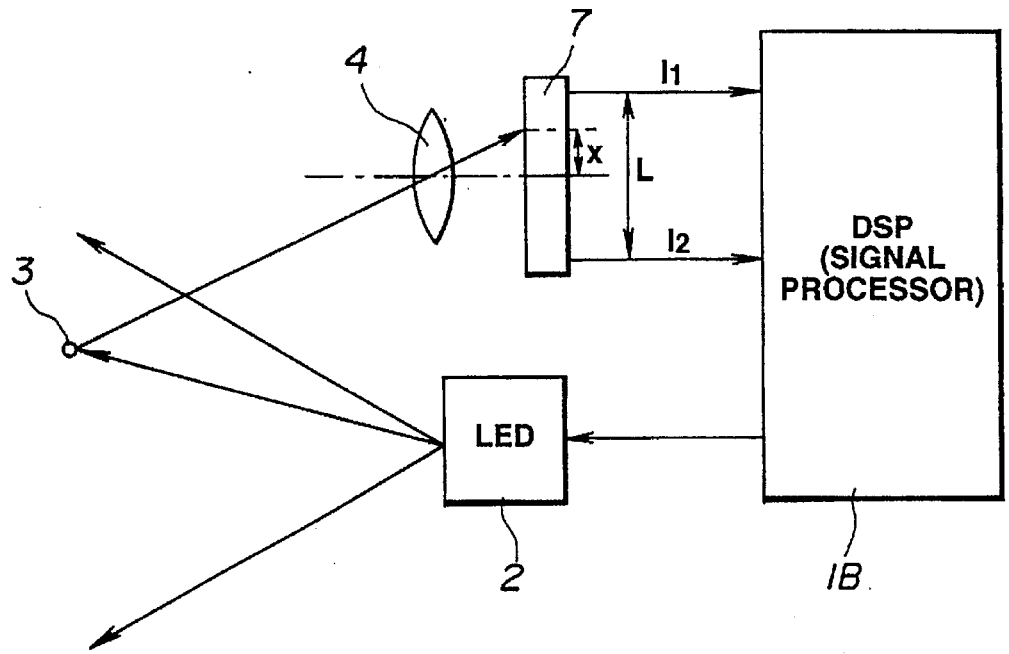
FIG. 5 is an optical system and electric circuit block diagram of the target position detecting apparatus in a third preferred embodiment according to the present invention.

FIG. 5 shows a third embodiment of the target position detecting apparatus according to the present invention.

In the third embodiment, a position detection sensor (PSD) chip 7 and the signal processor 1B in which the content of detection is changed from that in the case of the signal processor 1 of the first embodiment are used in place of the photodiode array 5 and scanned switch array 6 in the first embodiment shown in FIG. 1.

The other arrangement of the third embodiment is the same as that in the first embodiment.

The PSD 7 is a circuit to detect the light received position according to its current flow having two output terminals. Each output current from the corresponding one of the output terminal is denoted by I1 and I2. Then, the PSD 7 can calculate the position on the PSD 7 on which the reflected light is impinged using the following equation (2):

$$X = (I1-I2)/(I1+I2) \cdot L/2 \qquad (2).$$

In the equation (2), X denotes a distance from a neutral (center) point of the PSD to the position on which the reflected light is impinged and L denotes a longitudinal distance (dimension) between the two output terminals. Hence, if the PSD 7 as described above is selected, the scanned switch array 6 can be eliminated.

Figure 6:
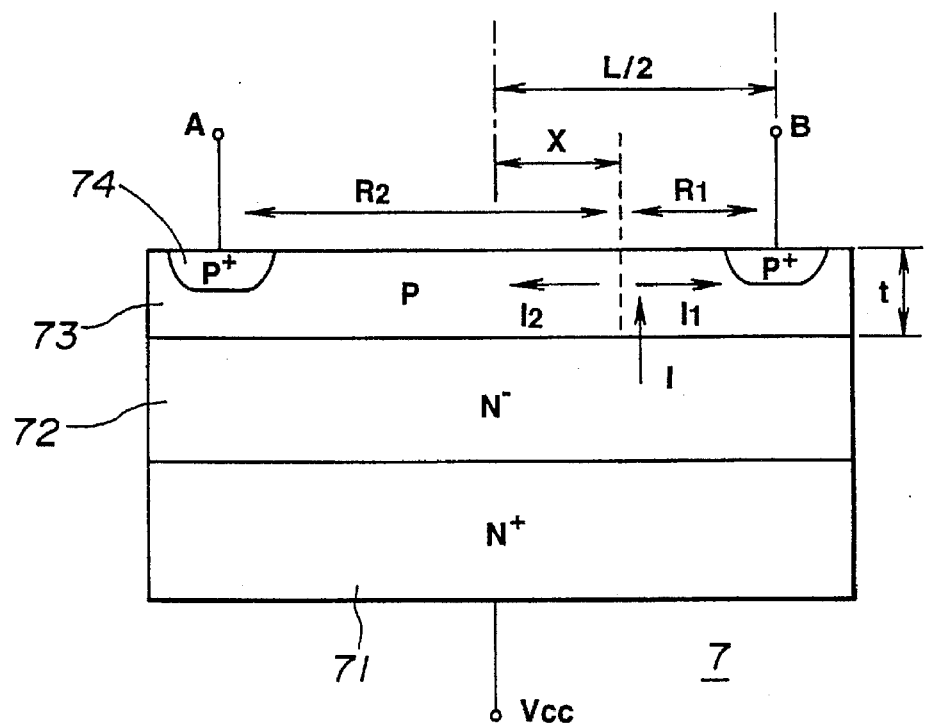
FIG. 6 is a cross sectional view of a previously proposed PSD (Position Sensitive Device) chip as a comparative example.
Figure 8A:
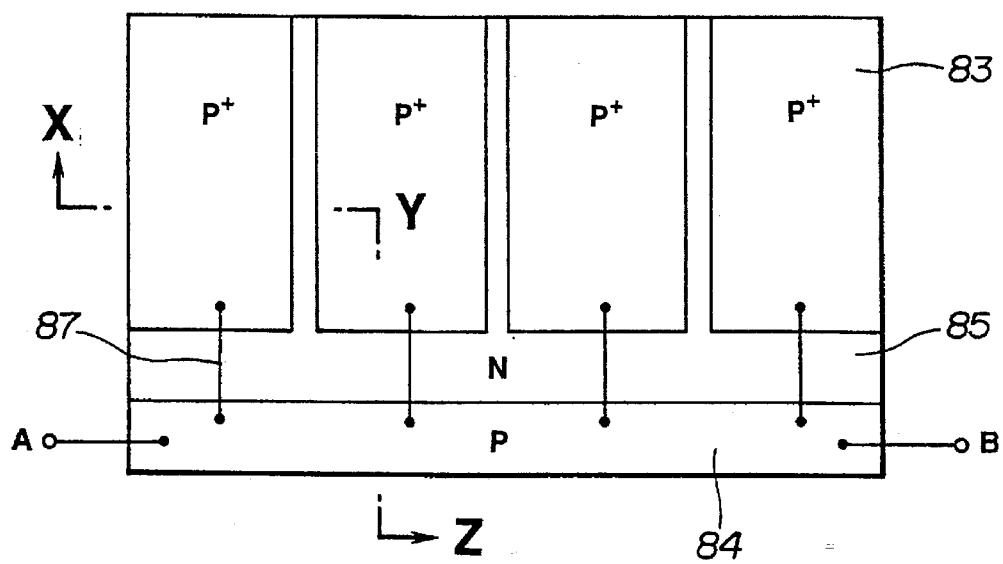
FIGS. 8A and 8B are a laterally cross sectional view of the PSD chip shown in FIG. 6 and a longitudinally cross sectional view cut way along a line from X to Z via Y of FIG. 8A, respectively.
Figure 8B:
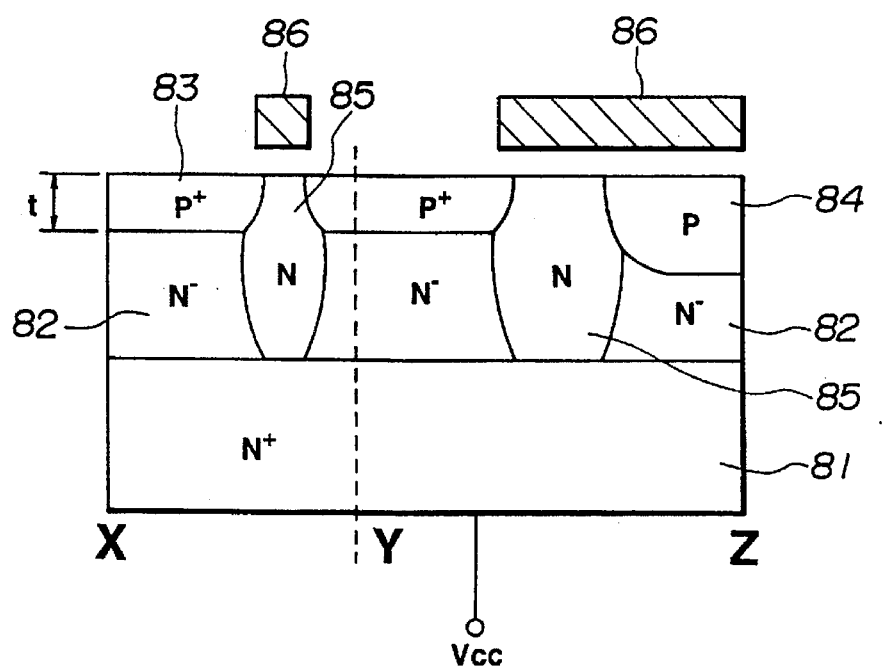

FIG. 6 shows a basic operation principle of the PSD 7 as a comparative example of FIGS. 8A and 8B of the third embodiment.

The PSD chip 7 shown in FIG. 6 is exemplified by an English literature titled Microelectronics and Signal Processing Series, Silicon Sensors authored by S. Middelhoek and S. A. Audet at Academic Press, in 1989.

The PSD chip 7 in the comparative example includes: an $N^+$ substrate 71; an $N^-$ type epitaxial region 72 formed on the $N^+$ substrate 71; a low concentration P type diffusion region 73 on the $N^-$ type epitaxial region 72; and P type diffusion regions connected to the respective output terminals A and B via corresponding one of a high concentration $P^+$ type contact region 74. The P type diffusion regions act as anodes of PIN photodiode and at the same time as resistors.

As shown in FIG. 6, the photocurrent I flows through the part of the PSD 7 on which the light is impinged. The photocurrent I flows out via the P type diffusion regions from the two output terminals A and B. Suppose that the currents flowing out through the terminals A and B are I2 and I1 and the resistances in the left and right P type diffusion regions through which the photocurrent I flows are denoted by R2 and R1, respectively.

At this time, one resistance R2 is proportional to [(L/2)+X] and the other resistance R1 is proportional to [(L/2)−X]. In addition, I1 is inversely proportional to R1 and I2 is inversely proportional to R2. Consequently, I1 is inversely proportional to [(L/2)−X] and I2 is inversely proportional to [(L/2)+X]. Hence, a correlation equation of the generated position X of the photocurrent I with respect to the current values I1 and I2 is derived as expressed in the equation (2).

However, a response time duration is determined according to the resistances in the P type diffusion regions and electrostatic capacitances of the PIN photodiodes between each region of the PSD 7. Since, in the comparative example shown in FIG. 6, the P type diffusion regions 73 are used as both the resistors and anodes of the PIN photodiode, a freedom of design is low. For example, it is necessary to enlarge a thickness t of the P type diffusion region and to enhance its impurity concentration in the P type region in order to reduce the resistance in the P type diffusion region and to speed up the response speed.

However, if the impurity concentration of the P type diffusion region is enhanced, a photo absorption rate of the PSD is enlarged. In addition, if the thickness t is enlarged, the transmission rate of light becomes lowered. Consequently, the photocurrent I is decreased and the sensitivity is reduced. Furthermore, the PSD in the comparative example, the whole chip is constituted by the PIN diode, a junction capacitance is so large that it takes a lot of time from a time at which the light is impinged thereon to a time at which a signal current flows externally and that the response speed is slow. Hence, when the PSD in the comparative example is used as the light received position detecting sensor of the radar, the output of the PSD is not present due to no response of the PSD to a velocity of the light beams since the velocity of the light beams is so fast that this slow PSD cannot follow the velocity of the light beams so that the radar apparatus using this PSD cannot function as the radar.

In the third embodiment, as the PSD which can detect the light received position thereat at the high speed, the whole surface is not constituted by the single photodiode but the separation regions are provided so that the plurality of photodiode cells are arranged in the array form and independent resistor regions are installed so that the degree of freedom of design is increased and the resistance value is sufficiently reduced. Thus, the detection speed of the position can be improved.

Figure 7:
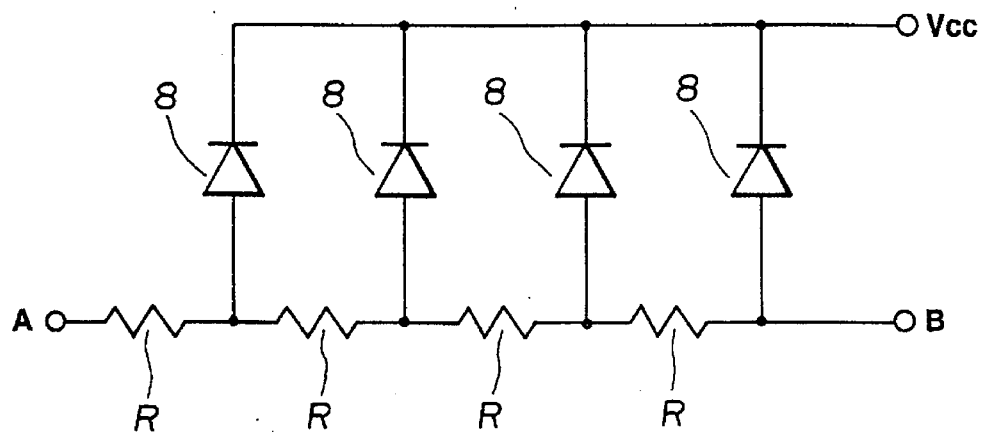
FIG. 7 is an electrical circuit block diagram of the PSD chip used in the third embodiment shown in FIG. 5.

FIG. 7 shows an equivalent circuit diagram of the PSD used in the third embodiment. FIGS. 8A and 8B show cross sectional views of the PSD used in the third embodiment.

FIG. 8A shows a flat surface IC pattern of the PSD used in the third embodiment and FIG. 8B shows a cross sectional view of the PSD cut away along a line of X–Y–Z shown in FIG. 8A. In FIG. 7, the photodiode array 8 is constituted by the plurality of photodiode cells as in the same way as in the first embodiment. As appreciated from FIG. 7, each anode of the respective photodiode cells 8 is connected to another photodiode cell located adjacent to each anode of the cells 8 via the corresponding one of the resistors R.

Each photodiode cell is, as shown in FIGS. 8A and 8B, constituted by a plurality of high concentration $P^+$ type diffusion regions 83, the $N^-$ type epitaxial region 82, and the $N^+$ type substrate 81 in the upper order. Each region of the $P^+$ type regions 83 and the $N^-$ type epitaxial region 82 is separated via N type separation regions 85 from each other. It is noted that the concentrations of the $P^+$ type diffusion regions 83 are sufficiently high so that their resistance components are negligible. In addition, since the thickness t in each $P^+$ type diffusion region 83 is sufficiently thin, a sufficient transmission of light can be assured. Then, each $P^+$ type diffusion region 83 separated is furthermore connected to a diffusion resistor 84 via a lead (conductive) line 87.

A resistivity of the diffusion resistor 84 is set to a sufficiently higher value than that of the $P^+$ type diffusion region 83. The resistance value of the diffusion resistor 84 is determined according to its width, length, thickness, and the impurity concentration of the diffusion resistor 84. Since it is not necessary to absorb the light in the regions on which the diffusion resistor is formed, the thickness of the diffusion region and its impurity concentration can freely be selected.

Consequently, the resistance value of the diffusion resistor 84 can be set to a sufficiently small value and the response speed can be enhanced. In addition, the PIN photodiode is formed only just straightly below the diffusion region 83 and the electrostatic capacitance is provided between the region 83 and the PIN photodiode. However, the electrostatic 20 capacitance is not provided on the separation regions. Thus, the electrostatic capacitance corresponding to the area of the separation regions 85 becomes small and, thereby, the response speed can be fastened. Furthermore, the light interruption region 86 constituted by the Aluminum (Al) is formed on the separation regions 85 and and the diffusion resistor 84.

To detect the position of the target 3, the currents flowing out from both output terminals A and B are measured and the position of the PSD on which the reflected light is impinged is calculated using the above-expressed equation (2).

It is noted that, in the third embodiment shown in FIGS. 7, 8A and 8B, the values of X take discrete values. That is to say, all of the lights impinged on the same (identical) photodiode cell output the same outputs and are calculated as the same position. Hence, in order to improve the accuracy of the position, each photodiode cell needs to be fined or miniaturized.

In the third embodiment, the structure of the PSD in the third embodiment is simpler than that of the photodiode array 5 in the first embodiment by the use of the switch array 6 and it is not necessary for the signal processor 1 to perform the scanning operation over the switch array 6. Thus, the structure of the signal processor 1B becomes simpler. In addition, since the currents I1 and I2 can be detected simultaneously, a processing time in the switch array scanning method of the first embodiment is increased in proportion to the number of cells. On the other hand, the processing time in the PSD detection method in the third embodiment is constant so that when the number of photodiode cells is increased, the detection of position of the target can be detected at an earlier timing than the scanning method using the scanned switch array.

Furthermore, since, as compared with the PSD in the comparative example shown in FIG. 6, the resistors used to detect the light received position and the anodes of the PIN photodiodes are separately installed, the degree of the freedom in design becomes large so that the resistance value of the diffusion resistor 84 can sufficiently be reduced. Since the junction capacitances on the PIN diodes as the minor units of the large number of cells are small, the time duration from the time at which the light beams are irradiated to the time at which the signal currents are output externally can be shortened and the response speed can be improved.

(Fourth Embodiment)

Figure 9A:
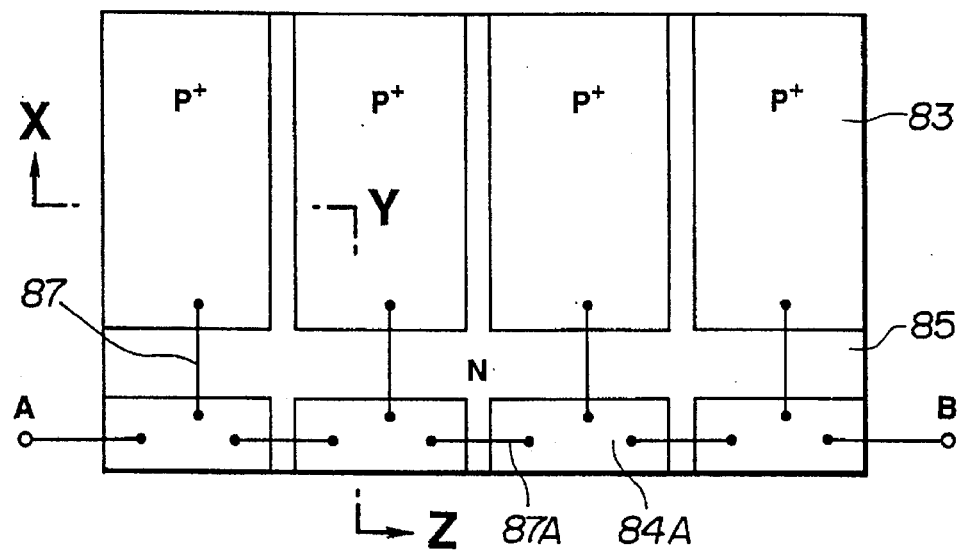
FIGS. 9A and 9B are a laterally cross sectional view of another type of the PSD chip used in the target position detecting apparatus in a fourth preferred embodiment according to the present invention and a longitudinally cross sectional view cut away along a line from X to Z via Y of FIG. 9A, respectively.
Figure 9B:
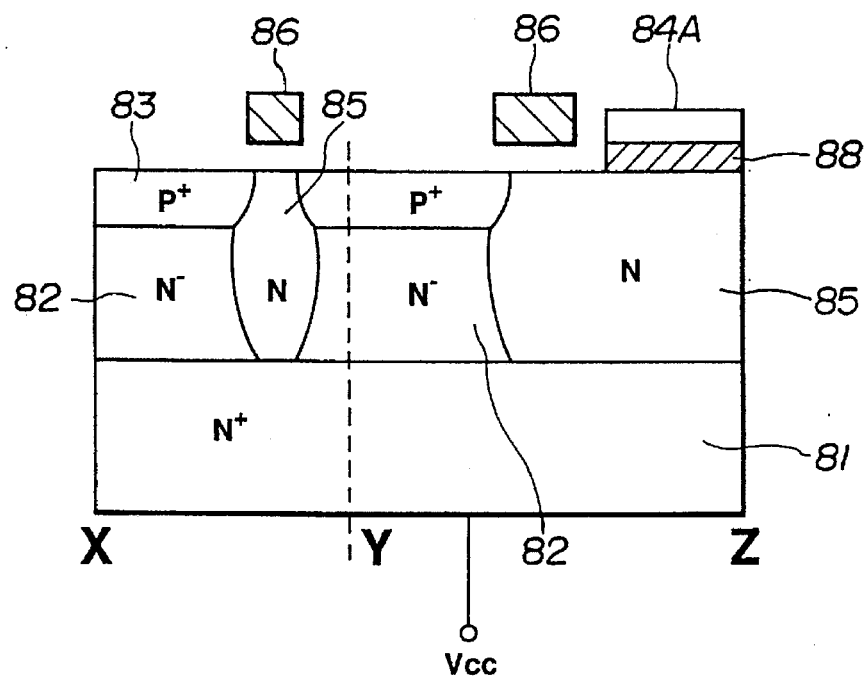

FIGS. 9A and 9B show a fourth preferred embodiment of the target position detecting apparatus according to the present invention.

In the fourth embodiment, a plurality of polycrystalline silicons 84A are used in place of the diffusion resistor 84 in the third embodiment. The other construction of the fourth embodiment is the same as that of the third embodiment.

FIG. 9A shows a flat surface patter of the PSD in the fourth embodiment and FIG. 9B shows a cross sectional view cut away along the line X-Y-Z of FIG. 9A.

Each polycrystalline silicon resistor 84A is not formed over the $N^+$ type substrate 81 but formed on the N type region 85 via an oxidation region 88 using a vapor deposition. Each resistor 84A is connected to a corresponding adjacent resistor 84A via a lead line 87A and is connected to the corresponding one of the $P^{3O}$ type diffusion regions 83. A conductive majority type of each polycrystalline silicon resistor 83 may be P type or N type. In addition, a single polycrystalline silicon band which is continued as a band may be used as the resistors via a plurality of contacts and may be connected to the respective photodiodes cells via the contacts without use of the lead lines 87A in the same way as the diffusion resistors 84 shown in FIGS. 8A and 8B.

In the fourth embodiment, the polycrystalline resistor(s) are used as the resistors, the capacitances parasitically strayed on the diffusion resistors can be reduced and, thereby, the response speed can furthermore be improved. The radar performance can remarkably be improved.

(Fifth Embodiment)

Figure 10:
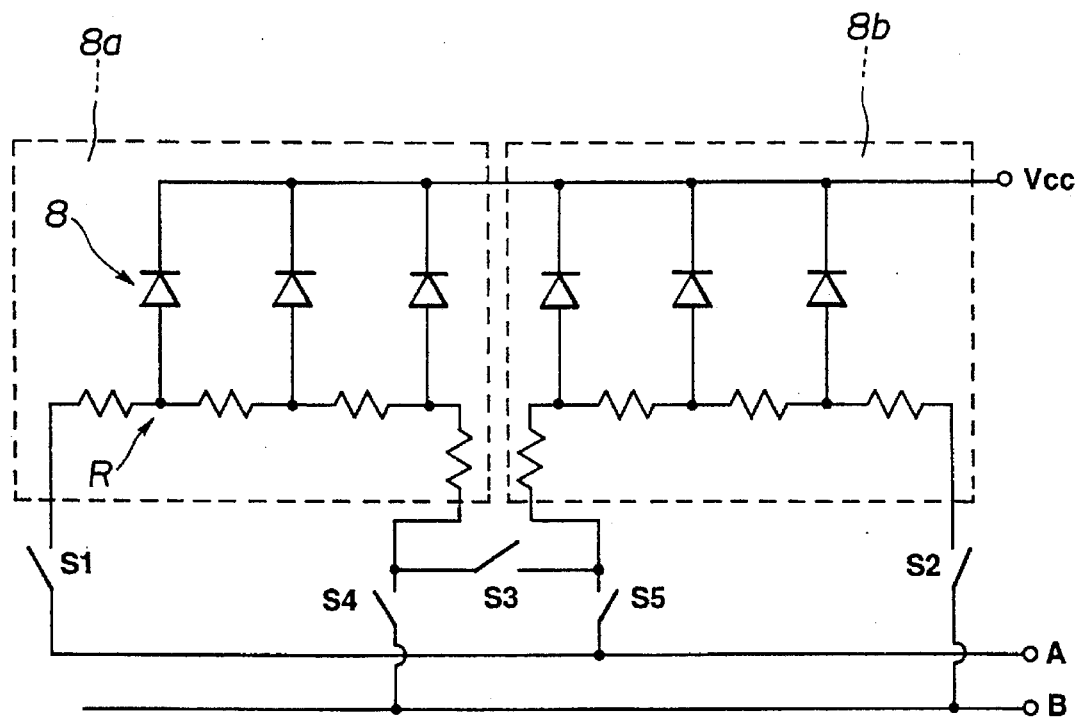
FIG. 10 is an explanatory view for explaining a position detection theory when using both PSD chip shown in FIGS. 9A and 9B and switching order in a fifth embodiment according to the present invention.

FIG. 10 shows a fifth preferred embodiment of the target position detecting apparatus according to the present invention.

In the fifth embodiment, two PSDs 8a and 8b are used which are described in the third or fourth embodiment and a plurality of switches are used so that the outputs of the respective PSDs 8a and 8b can be connected to the external terminals A and B.

It is noted that, in the PSD shown in the comparative example (FIG. 6) or in the third and fourth embodiments (FIGS. 8A and 8B and FIGS. 9A and 9B), when the two light beams are simultaneously impinged on two separate positions, the outputs of the PSD provide an intermediate position between the two separate positions, this providing an erroneous operation of the PSD.

In the fifth embodiment, first, second, and third switches S1, S2, and S3 shown in FIG. 10 are closed (in conduction states) and fourth and fifth switches S4 and S5 are open so that the two PSD's 8a and 8b act integrally as a single, larger PSD. In a case where both outputs indicate near both end positions, a possibility of the erroneous operation is low so that the outputs are directly derived through the both output terminals A and B. However, if their outputs indicate n position near to the center point of the PSD, there is a possibility that the two lights are accidentally input at the same time to the separate two end positions. In this case, the first and fourth switches S1 and S4 are closed (in conduction states) and the second, third, and fifth switches S2, S3, and S5 are open. Consequently, the right-side PSD 8b is separated so that the left-side PSD 8a only serves as the detection of the light received position. Next, when the second and fifth switches S2 and S5 are closed and the first, third, and fourth switches S1, S3, and S4 are open, the right-side PSD 8b only serves as the detection of the light received position. In this way, since either of the PSDs 8a and 8b is scanned so that the erroneous operation due to the simultaneous light receptions on the two or more separate photodiodes can be detected and the erroneous output of the direction of the target can be prevented.

(Sixth Embodiment)

Figure 11:
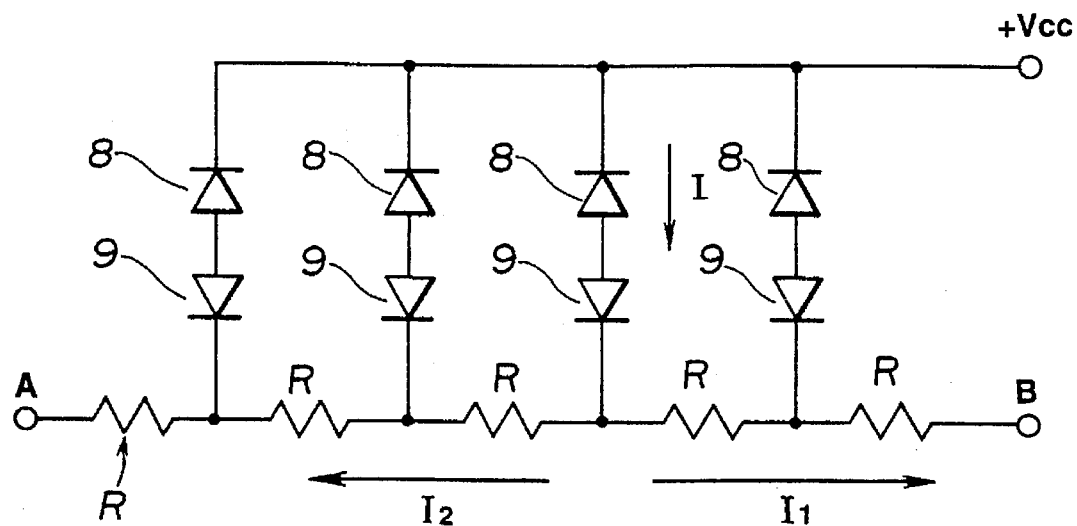
FIG. 11 is an equivalent circuit diagram of another type of the PSD in a sixth embodiment according to the present invention.

FIG. 11 shows a sixth preferred embodiment of the target position detecting apparatus according to the present invention in which the response speed can further be increased.

Figure 12:
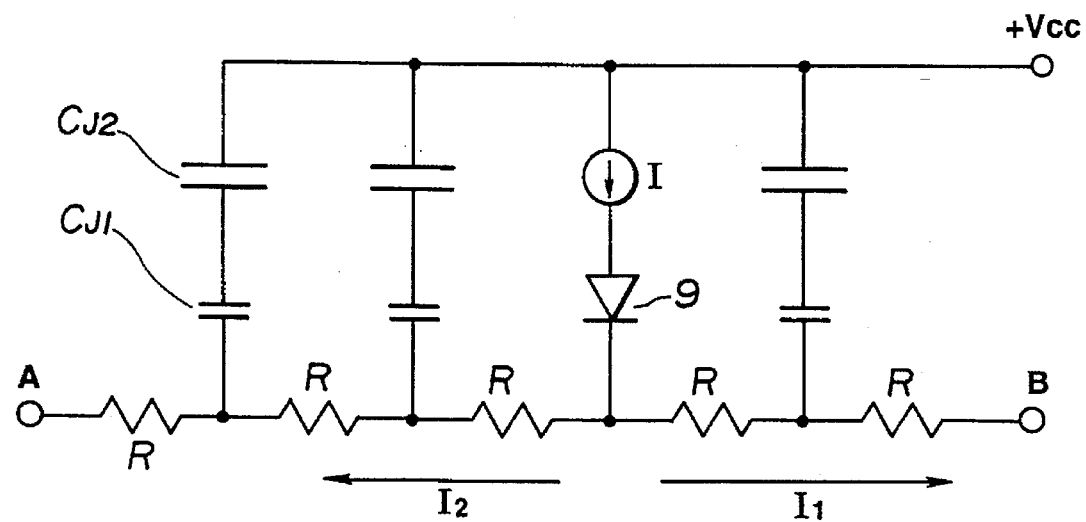
FIG. 12 is an equivalent circuit diagram of the other type of the PSD chip shown in FIG. 11.

FIG. 12 shows an equivalent circuit of the sixth embodiment shown in FIG. 11.

As shown in FIG. 11, each output end of the photodiode array 8 is connected to a row of the resistors R via a corresponding one of blocking diodes 9. Each blocking diode 9 is connected to the corresponding one of the cells of the array 8 in a reverse direction to which the photodiode current I flows (i.e., each anode of the corresponding one of the blocking diodes 9 is connected to the anode of the corresponding one of the cells). Since the blocking diodes 9 need not to receive the light beams, the shielding over the blocking diodes 9 may be used.

In operation, since one of the photodiodes 8 receives the light and its photocurrent I flows, a voltage on the corresponding one of the resistors R is varied. At this time, if no blocking diode 9 is present, a displacement current flows into one of the other photodiode cell due to its variation. This is because if no blocking diode is present any more, junction electrostatic capacitances for all photodiode cells are connected in parallel to each other so that the total electrostatic capacitance becomes larger.

Hence, in the sixth embodiment, each blocking diode 9 is inserted so as to be connected to the corresponding one of the photodiodes 9. Since the blocking diodes 9 have sufficient forward conductivities such that a minute photocurrent flowing from the corresponding one of the cells 8 is caused to flow in the forward direction thereof, its PN junction area can sufficiently be reduced. Thereby, the displacement current due to the electrostatic capacitance becomes difficult to flow. This is because, as shown in FIG. 12, a small electrostatic capacitance $Cj1$ ($j=1, 2, 3, ---, j$) of the corresponding one of the blocking diodes 9 is connected in series with the electrostatic capacitance $Cj2$ that the corresponding one of the photodiodes 8 so that the whole capacitance of the PSD can be reduced.

Since each blocking diode 9 is sufficient to have a small capacity as a diode, each blocking diode 9 may, for example, be constituted by a polysilicon diode may be used.

Alternatively, the positive power supply+Vcc may be replaced with a negative power supply–Vcc. In this case, all of the diodes 8 and 9 may be reversely connected.

Figure 13:
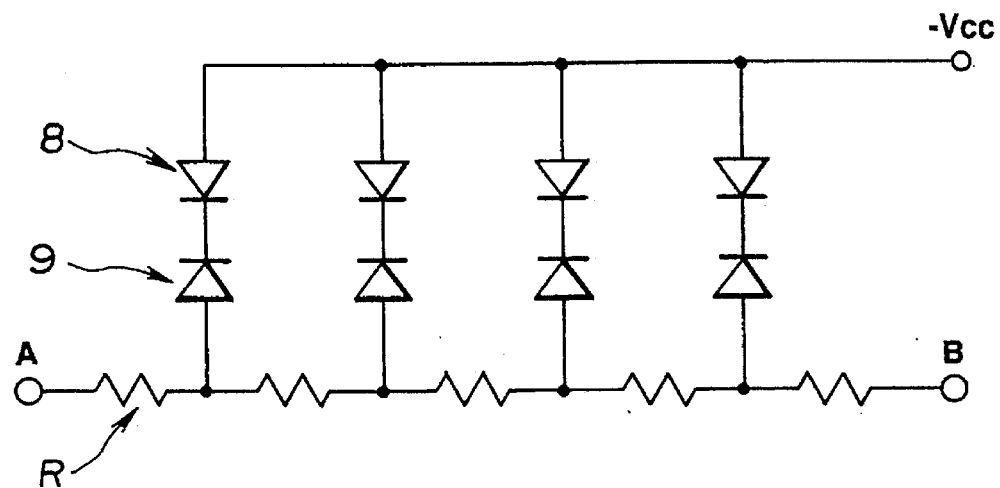
FIG. 13 is an equivalent circuit diagram of the other type of the PSD chip as a modification of the sixth embodiment shown in FIG. 11.

FIG. 13 shows a modification of the sixth embodiment of FIGS. 11 and 12.

In the sixth embodiment, since the insertion of the blocking diodes 9 into the photodiode array 8 permits the reduction of the whole electrostatic capacitance in the PSD. Consequently, the other photodiode cells than the photodiode cell which is acted upon the reception of light can be separated from the photodiode and, thus, the response speed of the PSD can further be improved.

(Seventh Embodiment)

Figure 14:
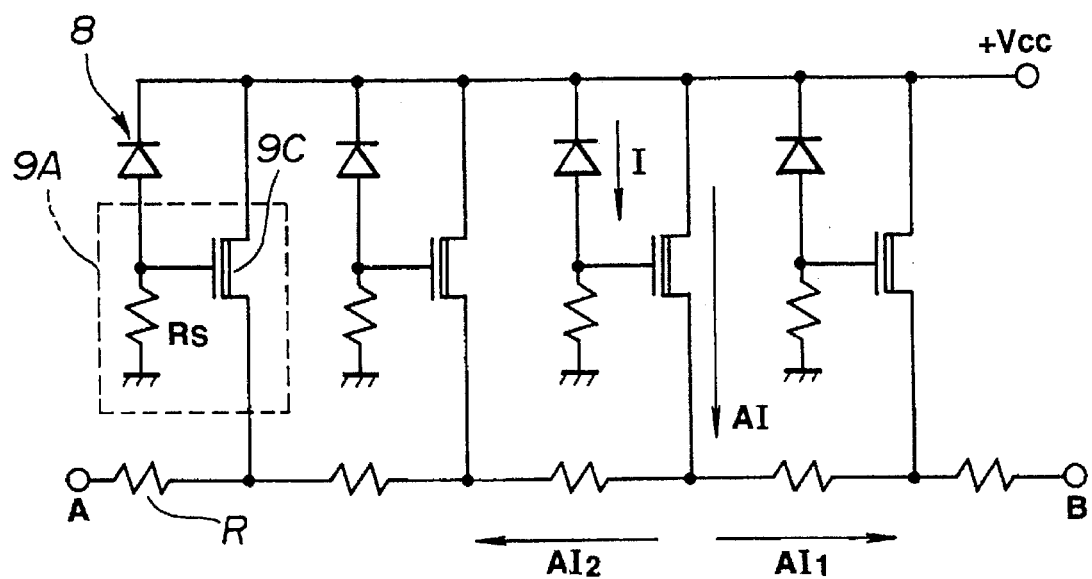
FIG. 14 is an equivalent circuit diagram of a still another type of the PSD in a seventh preferred embodiment of the target position detecting apparatus according to the present invention.

FIG. 14 shows a seventh preferred embodiment of the target position detecting apparatus according to the present invention.

Figure 15:
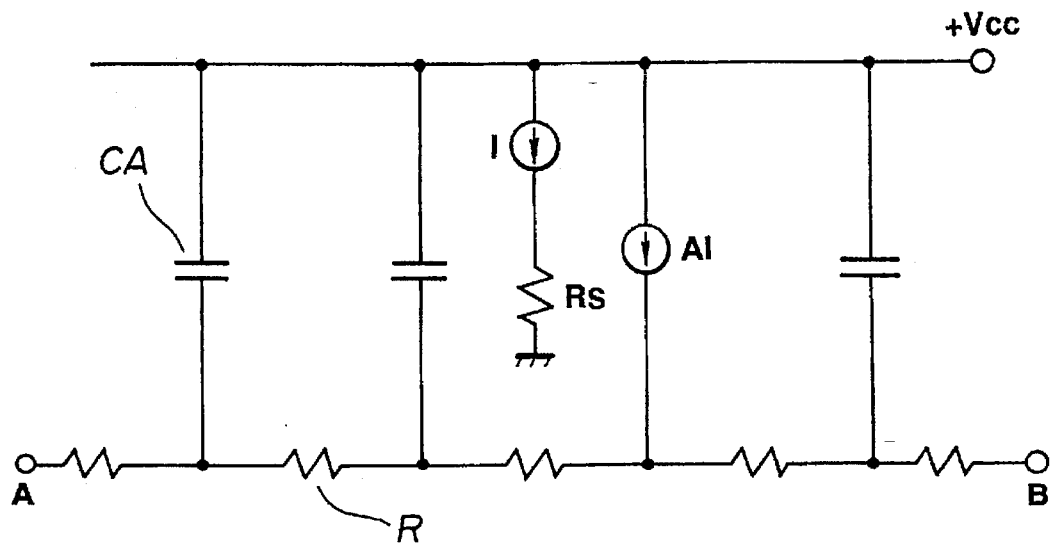
FIG. 15 is an AC equivalent circuit diagram of the still other type of the PSD chip in the seventh embodiment shown in FIG. 14.

FIG. 15 shows an AC current equivalent circuit of FIG. 14.

In the seventh embodiment, a buffer circuit 9A is used in place of each of the blocking diodes 9 in the sixth embodiment shown in FIGS. 11 through 13. The other structure of the seventh embodiment is the same as that of the sixth embodiment.

Each buffer circuit 9A includes: a resistor Rs connected to each anode of the photodiode cells 8 so as to receive the photocurrent I from the corresponding one of the photodiodes 8 and convert it into a voltage thereacross, the converted voltage being applied to a gate of each corresponding one of source follower type MOSFET 9C. Consequently, a current AI proportional to the current I flowing out through its source so that currents AI2 and AI1 are caused to flow out from the output terminals A and B.

At this time, since the output electrostatic capacitance CA of the buffer circuit 9A itself has a small value, the displacement current due to the currents AI1 and AI2 cannot be caused to flow into each of the other photodiode cells. Consequently, the responsive characteristic of the PSD can be improved. Furthermore, since the buffer circuits 9C are installed, the photocurrent I can be amplified so that the detection of the position of the light received cell can further easily located. In FIG. 15, AI denotes a constant current source, I denotes the photocurrent corresponding to a constant current supply of I and CA denotes the output electrostatic capacitance of each buffer 9A.

(Eighth Embodiment)

Figure 16:
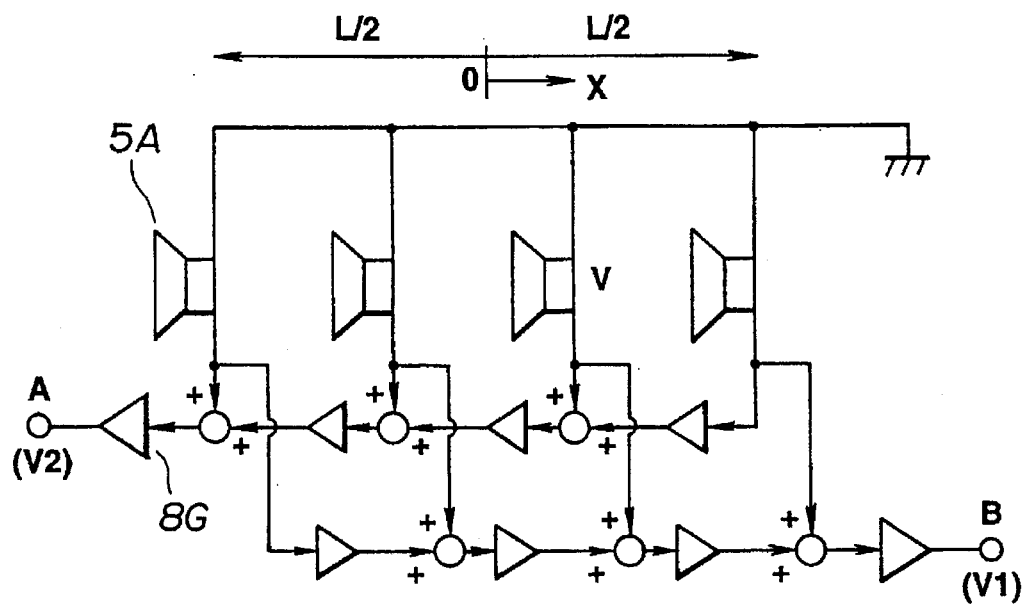
FIG. 16 is an equivalent circuit diagram of the target position detecting apparatus in an eighth preferred embodiment according to the present invention.

FIG. 16 shows an eighth preferred embodiment of the target position detecting apparatus according to the present invention.

Although in the PSD described in each of the previous embodiments the resistor is used to detect the signal received position, it is difficult to use such a resistor as described above in a case where a signal source can be deemed to be a voltage source. For example, in a case where the second embodiment shown in FIG. 4 is not applicable to the scanning method of scanning the switch array 6 but applicable to the PSD detection method, it is difficult to pick up the current since an internal impedance of the signal source is high if a piezoelectric type small-sized microphones are used as the small-sized microphone array 5A and it is impossible to detect the light received position using the resistors. Hence, in the eighth embodiment, the PSD can be used even if the signal source is the voltage source.

As shown in FIG. 16, the output of each small-sized microphone in the microphone array 5A is added to the outputs of the left and right adjacent small-sized microphones via its left and right sided amplifiers 8G. End terminals of the amplifier string 8G serve as the output terminals A and B.

Suppose herein that only one of the small-sized microphones which is separated from a center O of the microphone array 5A by a distance X receives the ultrasonic wave and its output voltage is V.

Then, suppose that a voltage appearing on the output terminal A is V2 and the voltage appearing on the output terminal B is V1.

At this time, if $\Delta$ denotes a pitch of the small-sized microphone array 5A, log(V2/V) is proportional to $$[L/2+X] \cdot \log G/\Delta \qquad (3).$$

In addition, log(V1/V) is proportional to $$[L/2-X] \cdot \log G/\Delta \qquad (4).$$

Hence, log (V2/V1) is proportional to 2X. That is to say, if V1 and V2 are measured, the position of X can be calculated. An amplification factor G of each amplifier 8G may be arbitrary except 1. That is to say, an attenuator may be replaced with each of the amplifiers 8G.

As described above, in the eighth embodiment, the amplifier string or attenuator string may be used so that even if the internal impedance of the signal source is large, the signal source can be used in the same way as the current supply. Consequently, the high speed detection of the received position can be achieved.

(Ninth Embodiment)

Figure 17:
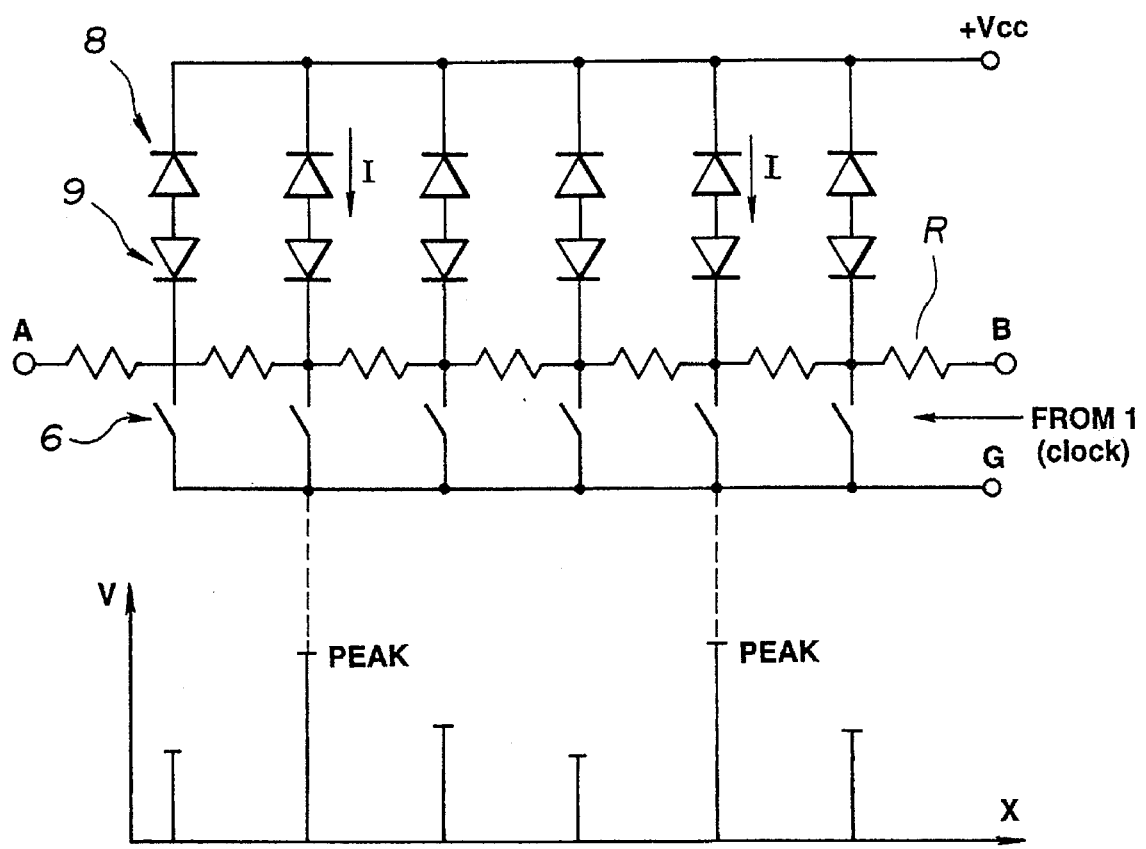
FIG. 17 is an equivalent circuit diagram of the target position detecting apparatus in a ninth preferred embodiment according to the present invention.

FIG. 17 shows a ninth preferred embodiment of the target position detecting apparatus.

In the ninth embodiment, the switching array 6 is added so as to connect to the PSD described in the sixth embodiment shown in FIG. 11.

If two or more of the targets 3 are present and a high possibility of the erroneous operations is present, the scanning over the scanned switch array permits the measurement of voltages at junction points connecting the respective resistors with the diode cells. In addition, since voltages of the measuring junction points corresponding to the detected positions of the PSD at which the reflected lights are received from the targets have peaks, the number of peaks of the potentials are searched to identify the number of targets. For example, in the case of FIG. 17, it is recognized that, since the number of peaks are two, the number of targets are two. Thus, the erroneous operation of the PSD due to the presence in the plurality of targets can be prevented.

In the sixth embodiment shown in FIG. 11, the fixed resistors are used in the PSD chip.

Figure 18:
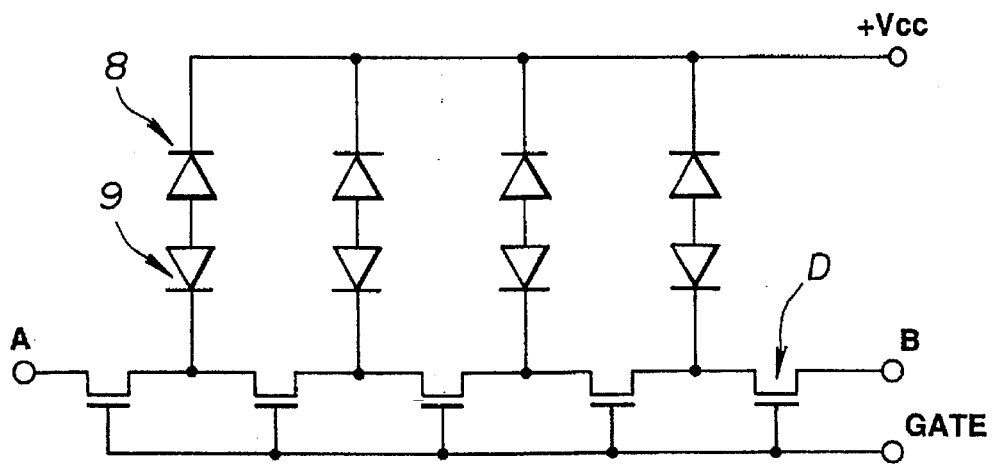
FIG. 18 is an equivalent circuit diagram of another type of the PSD chip in an alternative of the ninth preferred embodiment shown in FIG. 17.

However, FIG. 18 shows an alternative of the sixth embodiment shown in FIG. 11.

As shown in FIG. 18, transistor D whose gates are connected in common to each other and to a G terminal are used in place of the fixed resistors R shown in FIG. 17.

The transistors D used in the alternative of the sixth embodiment shown in FIG. 18 may be constituted by MOSFETs or TFT (Thin Film Transistors). In this case, if the common gate voltage is varied in a range in which the MOSFETs or TFTs are operated in linear regions, a sensitivities and response time can be adjusted.

In the first through ninth embodiments, the direction(s) of the target(s) in the one dimensional direction are measured.

However, the target position detecting apparatus according to the present invention can measure the target direction (s) in terms of two dimensional directions.

Figure 19:
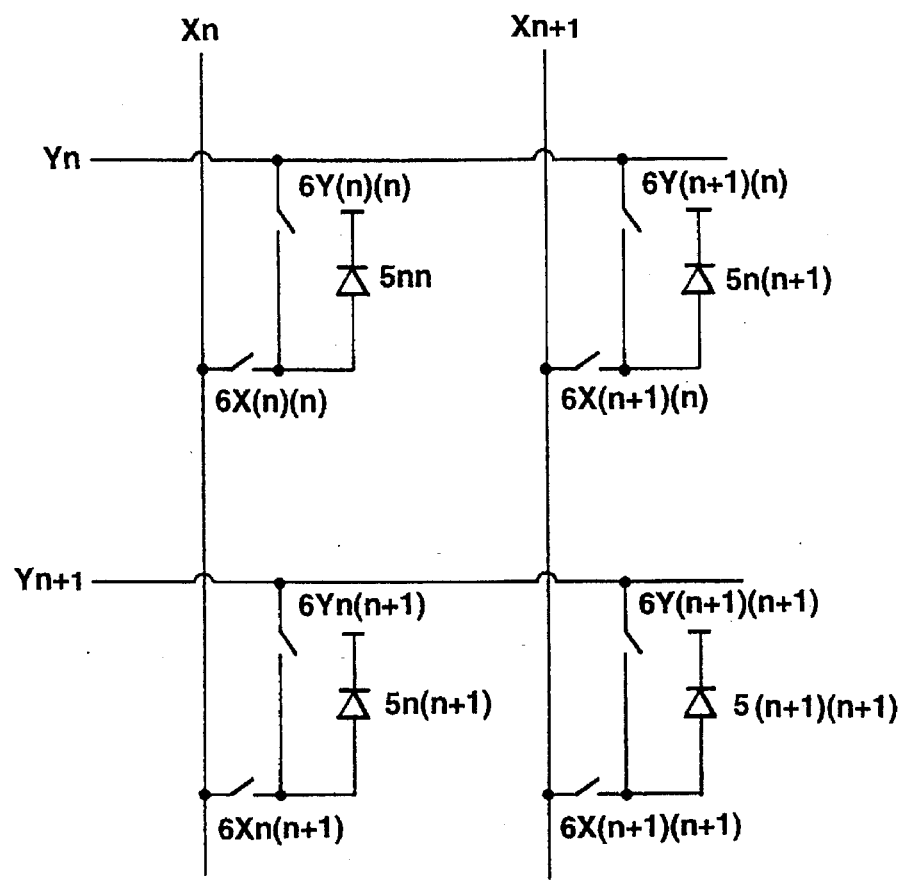
FIG. 19 is an explanatory view for explaining a two-dimensional positional detection to be applicable to the first embodiment shown in FIG. 1.

FIG. 19 shows an alternative of the first embodiment shown in FIG. 1.

In FIG. 19, two-dimensional photodiode array $5_{xy}$ (x=1, ---, n, n+1, ---, y=1, ---, n, n+1, ---) is scanned by means of the two-dimensional switch array $6_{xy}$ so that the light received photodiodes can be detected.

In addition, a two-dimensional PSD chip may be used. In the case where the two-dimensional PSD is used, the high speed response technique described above can be applied to the two-dimensional PSD.

Furthermore, such electromagnetic waves as milliwaves or microwaves may be used in place of the light beams. The present invention is applicable to the radar in which phase deviations of the reflected waves are measured using the modulated continuous waves or to the radar in which a relative velocity to the moving object to be detected is measured utilizing a Doppler effect.

The radar target position detecting apparatus according to the present invention is applicable to a collision warning apparatus, intervehicle distance warning apparatus, a cruise speed controlling apparatus, or a obstacle collision preventing apparatus. If the radar target position detecting apparatus according to the present invention is applied to one of the above-listed apparatuses, a more precise control such that, for example, the target is reduced to a vehicle running in the same traffic lane as the vehicle on which the radar target position detecting apparatus is mounted so as to prevent an erroneous warning of, for example, the collision.

What is claimed is:

1. An apparatus comprising:
   a) beam transmitting means for generating and transmitting beams of at least one of either electromagnetic waves or ultrasonic waves, said beams being provided with a fixed predetermined divergence angle with said beam transmitting means as a vertex;
   b) beam receiving means for receiving at least one reflected beam of the transmitted beams, said beam receiving means including a plurality of individually operable beam receiving elements arranged in an array form and each one of the beam receiving elements having a mutually different directivity from those of any other beam receiving elements;
   c) first measuring means for determining which one of the beam receiving elements receives the reflected beam and determining a direction of the reflected beam with respect to the reflected beam receiving element on the basis of a position of the reflected beam receiving element in said array formed plurality of beam receiving elements; and
   d) second measuring means for measuring a time duration from a time at which said beams are transmitted from said beam transmitting means to a time at which said reflected beam receiving element has received the reflected beam and calculating a distance from a beam reflected point of the transmitted beams to the reflected beam receiving element on the basis of the measured time duration.

2. An apparatus as claimed in claim 1, wherein the reflected beam is a wave reflected from at least one target located on the point falling within the fixed predetermined divergence angle and the direction of the reflected beam is a direction of the target with respect to the position of the reflected beam receiving element, the target having reflected at least one of the transmitted beams.

3. An apparatus as claimed in claim 1, wherein said first measuring means further comprises: f) a plurality of drive switches connected to the respective beam receiving elements and so arranged and constructed as to be switched when the corresponding one of the connected beam receiving elements receives the reflected beam; and g) scanning means for scanning the beam receiving elements in the array form to determine which one of the beam receiving elements has received the reflected beam according to the positions of the switched condition of the plurality of drive switches.

4. An apparatus as claimed in claim 1, wherein said beam receiving elements are constituted by a photo sensing device and at least two amplifiers connected between both output ends of each adjoining beam receiving element, a detection signal being output via one of the the amplifiers from both ends of the photo sensing device so that the second measuring means determines the position of the one beam receiving element which receives the reflected beam according to a magnitude of the detection signal.

5. An apparatus as claimed in claim 1, wherein said beam receiving elements are constituted by a photo sensing device and a resistor connected between both output ends of each adjoining beam receiving element, a detection signal being output via one of the resistors from both ends of the photo sensing device chip so that the second measuring means determines the position of the one beam receiving element which received the reflected beam according to a magnitude of the detection signal.

6. An apparatus as claimed in claim 1, wherein said beam transmitting means transmits the beams of either a visible light or ultra-red light and the receiving means comprises array formed plurality of photodiodes.

7. An apparatus as claimed in claim 1, wherein said beam receiving means comprises a plurality of photodiodes arranged in the array form, each output end of the photo diodes being connected to one end of each corresponding one of a plurality of resistors, each resistor having a resistance value which is so large that a resistance of a diffusion region providing an output terminal of the corresponding one of the photo diodes is negligibly small, and the other end of each resistor being connected to an output end of its adjacent one of the photo diodes.

8. An apparatus as claimed in claim 7, wherein said beam receiving means further comprises a plurality of blocking diodes having anodes and cathodes which are reversed to those of the respective photo diodes and which are connected to the respective output ends of the photo diodes and wherein said resistors are connected to the respective output ends of the photo diodes via said corresponding blocking diodes.

9. An apparatus as claimed in claim 8, wherein said beam receiving means further comprises a plurality of buffer circuits, output ends of the respective buffer circuits being connected to one ends of said respective resistors and the other ends of said respective resistors being connected to the corresponding output ends of their adjacent buffer circuits.

10. An apparatus as claimed 1, wherein said beam transmitting means is a single beam transmitter disposed separate and apart from said beam receiving means.

11. A radar apparatus for at least one wave reflective object, comprising:
   a) wave beam irradiating means for operatively irradiating wave beams toward a spatial region which is wide enough to include said wave beam reflective object therein;
   b) wave beam responding means arranged for receiving at least one wave beam irradiated toward the statial region from said wave beam irradiating means and reflected on said reflective object, said wave beam responding means having an array of a plurality of wave beam responding elements arranged at a position of the radar apparatus, each one of said wave beam responding elements having a directivity with respect to the spatial region which is different from those of the other wave beam responding elements;
   c) first measuring means for identifying one of said wave beam responding elements which receives the reflected wave beam and measuring a direction of the reflective object with respect to the wave beam responding element on the basis of a position of the identified wave beam responding element; and
   d) second measuring means for measuring a time duration from a time at which the wave beams are irradiated by said wave beam irradiating means to a time at which said reflective wave beam is received by said wave beam responding element and for deriving a distance from the radar apparatus and said wave beam reflected object on the basis of the measured time duration.

12. A radar apparatus for at least one wave reflective object as claimed in claim 11, which further comprises: e) command signal generating means for outputting a command signal to said wave beam irradiating means so that the wave beam irradiating means irradiates the wave beams in response to the command signal.

13. A radar apparatus as claimed in claim 12, wherein said wave beam irradiating means comprises a light emitting diode which emits light pulses toward the spatial region with a fixed predetermined divergence angle so as to include the wave beam reflective object therein.

14. A radar apparatus as claimed in claim 13, wherein said wave beam responding means comprises the array of a plurality of photodiodes, each of the photodiodes being so arranged and constructed as to generate and cause to flow a photocurrent I when the reflected light pulse is received thereat.

15. A radar apparatus as claimed in claim 14, wherein said first measuring means comprises an array of a plurality of analog switches, each analog switch being connected in series with the corresponding one of the photodiodes and being closed when a drive signal is received by its drive end.

16. A radar apparatus as claimed in claim 15, wherein said first measuring means further comprises scanning means for outputting said drive signal sequentially to each of said analog switches so as to receive the photocurrent I from any one of the photodiodes via the corresponding one of the analog switches serially connected to the wave beam received photodiode, thus identifying one of the photodiodes which generates and outputs the photocurrent I.

17. A radar apparatus as claimed in claim 16, which further comprises a lens located in front of the array of the photodiodes and wherein said first measuring means derives the direction θ of the wave beam reflective object with respect to the reflected light pulse received photodiode as a function of x and y, wherein x denotes a distance from an optical axis of the lens to the light pulse received photodiode and y denotes a distance from the array of the photodiodes to the lens.

18. A radar apparatus as claimed in claim 11, wherein said wave beam irradiating means comprises an ultra sonic wave speaker irradiating ultrasonic waves having a predetermined divergence angle so as to include the wave beam reflective object in the spatial region and said wave beam responding means comprises an array of microphones.

19. A radar apparatus as claimed in claim 12, wherein said wave beams are light pulses and wherein said wave beam responding means comprises a PSD chip having two output terminals A and B, said PSD chip constituting said second measuring means for identifying a position of the PSD chip surface at which the reflected light pulse is received and said second measuring means derives the direction of the light pulse reflective object on the basis of the following; X is a function of I1, I2, and L, wherein X denotes a distance from a center position of the PSD chip to the position at which the light pulse reflected by the light pulse reflective object is received, I1 denotes a current flowing from a photocurrent through one of the output terminal of the PSD chip, I2 denotes a current flowing from the photocurrent through the other output terminal, and L denotes a distance between both output terminals.

20. A radar apparatus as claimed in claim 18, wherein said PSD chip comprises an array of photodiode cells whose cathode terminals are connected to a plus bias supply (+Vcc) and a plurality of resistors, one end of each of the resistors being connected to an anode of the corresponding one of the photodiode cells and the other end of each of the resistors being connected to the anode of the corresponding adjacent one of the photodiode cells, the anode of an end positioned photodiode cell being directly connected to the one output terminal and the anode of another end positioned photodiode cell being connected to the other output terminal via one of the resistors.

21. A radar apparatus as claimed in claim 19, wherein each photodiode cell is constituted by a PIN photodiode and each one of the PIN photodiodes is separated by a separation region to another PIN photodiode and the resistors are constituted by diffusion resistors.

22. A radar apparatus as claimed in claim 20, wherein each photodiode cell is constituted by a PIN photodiode and each one of the PIN photodiodes is separated by a separation region to another PIN photodiode and the resistors are constituted by polycrystalline silicons.

23. A radar apparatus as claimed in claim 19, wherein said PSD chip comprises two aligned arrays of PIN photodiode cells, two arrays of resistors, and a plurality of switches, one of the two aligned arrays of PIN photodiode cells being selected depending on whether the position of the light received PIN photodiode is near to the center position of the PSD chip.

24. A radar apparatus as claimed in claim 21, wherein said PSD chip further comprises an array of blocking diodes, each anode of the blocking diodes is connected to the anode of the corresponding one of the PIN photodiodes and each cathode of the blocking diodes is connected to one end of the corresponding one of the resistors.

25. A radar apparatus as claimed in claim 21, wherein said PSD chip further comprises an array of blocking diodes, each anode of the blocking diodes is connected to the anode of the corresponding one of the PIN photodiodes and each cathode of the blocking diodes is connected to one end of the corresponding one of the resistors, each of said resistors being constituted by a MOSFET.

26. A radar apparatus as claimed in claim 25, wherein each anode of the PIN photodiodes is connected commonly to a minis bias voltage supply (−Vcc).

27. A radar apparatus as claimed in claim 21, wherein said PSD chip further comprises an array of buffer circuits connected between each cathode of the PIN photodiodes and a junction of the mutually adjacent resistors.

28. A radar apparatus as claimed in claim 18, which further comprises an array of amplifiers and an array of adders installed between the microphones and two output terminals and wherein said second measuring means derives two voltages (V2 and V1 ) at the two output terminals A and B so that the position X of the microphone array at which the ultrasonic wave reflected by the object is derived using the following relationship; X is a function of V1, V2, Δ and G, wherein X denotes a position of one of the microphones which has received the reflected ultrasonic wave, i.e., the distance from the ultrasonic wave received microphone to a center position of the microphone array, Δ denotes a pitch between the mutually adjacent microphones in the microphone array, and G denotes an amplification factor of each amplifier.

29. An apparatus as claimed in claimed 11, wherein said beam irradiating means is a single beam irradiator disposed separate and apart from said beam responding means.

30. An apparatus as claimed in claim 11, wherein said beams are irradiated from a single irradiator disposed separate and apart from said beam responding means.

31. A method for determining a position of at least one wave beam reflective object, comprising the steps of:

a) operatively irradiating wave beams toward a spatial region which is wide enough to include said wave beam reflective object therein in response to a command signal to command irradiation of said wave beams;

b) receiving at least one wave beam irradiated from said step a) and reflected on said reflective object, at said step b), providing wave beam responding means having an array of a plurality of wave beam responding elements arranged at a predetermined fixed position, each one of said wave beam responding elements having a directivity with respect to the spatial region different from those of the other wave beam responding elements; and c) identifying one of said wave beam responding elements which receives the reflected wave beam and measuring a direction of the reflective object on the basis of a position of the identified wave beam responding element.

* * * * *